Patented Oct. 30, 1928.

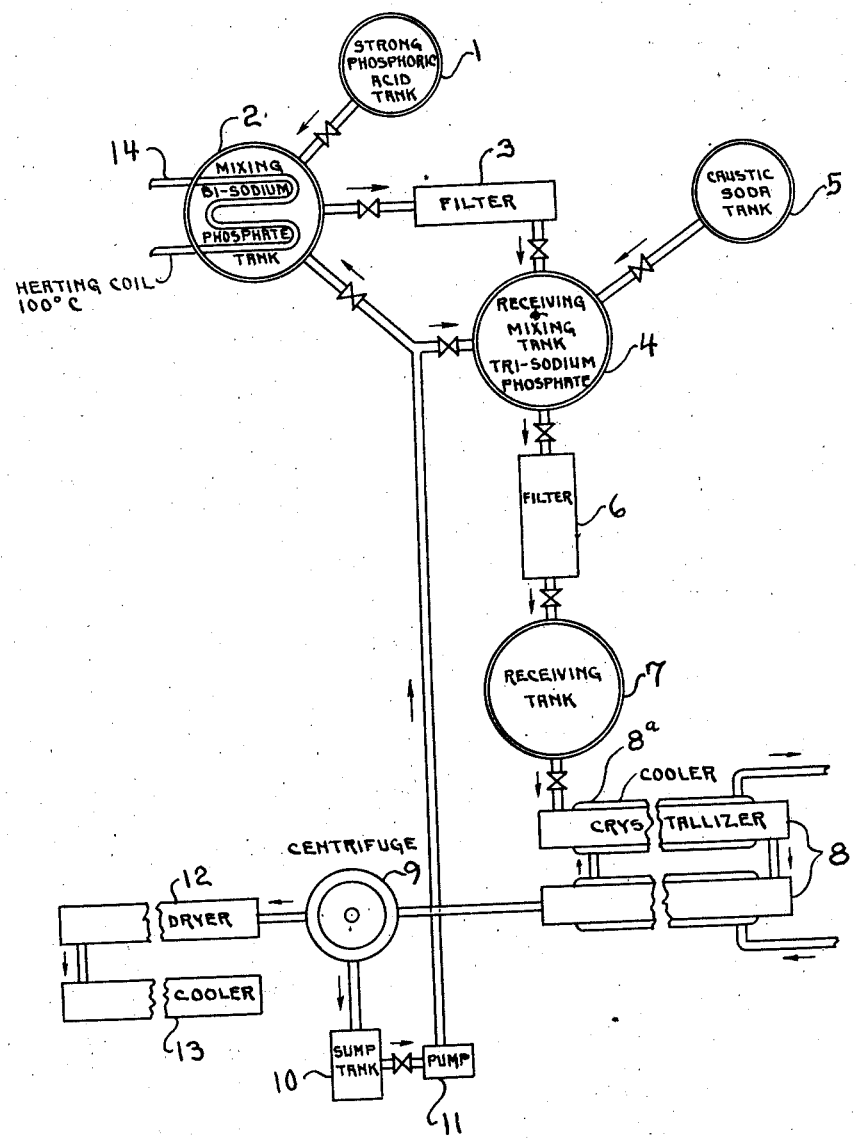

1,689,547

UNITED STATES PATENT OFFICE.

JOHN N. CAROTHERS, OF ANNISTON, ALABAMA, ASSIGNOR TO FEDERAL PHOSPHORUS COMPANY, OF BIRMINGHAM, ALABAMA, A CORPORATION OF ALABAMA.

METHOD FOR MAKING TRI-SODIUM PHOSPHATE.

Application filed August 8, 1925. Serial No. 48,965.

This invention relates to a method for making tri-sodium-phosphate, especially adapted to the use of concentrated phosphoric acid.

The object is to provide a method which requires less equipment and is therefore less costly, and which at the same time, has greater efficiency than existing methods which are adapted to the use of dilute phosphoric acid.

With these and other objects in view, the invention consists in the novel details of a method embodying features of construction and combination of equipment constituting my invention, more fully disclosed and particularly set forth in the appended claims.

Referring to the accompanying drawing, forming part of this specification, the apparatus comprises an acid tank 1 containing strong phosphoric acid, which is neutralized by the addition of sodium carbonate to di-sodium phosphate solution in mixing tank 2, from which the solution passes through filter 3 into the receiving and mixing tank 4, where caustic soda solution is added from dissolving tank 5. After thoroughly mixing the resultant tri-sodium phosphate solution in tank 4 it is passed through filter 6 and into receiving tank 7, from which it flows through crystallizers 8 which may have artificial coolers 8ª if desired. From the crystallizers the crystals and a portion of the mother liquor pass into the centrifuge 9 where the crystals are de-watered. The mother liquor passes from the centrifuge 9 into the sump tank 10 and thence is returned by pump 11 to mixing tank 2 or 4, according to operation requirements, while the crystals pass first through dryer 12 and then through cooler 13, after which they may be shipped as dried or screened crystals in any well known manner. The elements of the foregoing apparatus are conveniently illustrated as they constitute severally standard equipment.

In order that the operation of my method carried out in my apparatus may be clearly understood and practiced by those skilled in the art, I will outline the procedure involved. In the production of tri-sodium phosphate a large percentage of the compound is water which is present as water of crystallization. The compound is represented by the chemical formula $Na_3PO_4 \cdot 12H_2O$, from which an inspection shows there is present approximately 57% water of crystallization. I proceed by adding sodium carbonate and strong phosphoric acid simultaneously in a mixing tank, where di-sodium phosphate is formed. By strong phosphoric acid I mean an acid of such concentration that it will not be necessary to employ any evaporation step in my process, but the water with the phosphoric acid, the di-sodium phosphate filter press water, and that necessary to dissolve the caustic soda will provide enough to supply the water of crystallization in the product. This acid may range from 50% to 75% $H_3PO_4$, depending on operating conditions, and while 50% $H_3PO_4$ may be continuously used provided the di-sodium filter press water be reduced in proportion to the additional water added by such acid, it is preferable to employ acid of higher concentrations. The phosphoric acid and sodium carbonate are added until di-sodium phosphate is formed, having, in case iron tanks are used, a slight excess of sodium carbonate. Where acid resistant tanks are used no excess of sodium carbonate is needed. The chemical reaction is represented by the following equation:

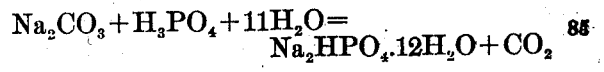

$$Na_2CO_3 + H_3PO_4 + 11H_2O = Na_2HPO_4 \cdot 12H_2O + CO_2$$

The solution is heated approximately 100° C. by a heating coil 14 to expel all dissolved carbonic acid ($CO_2$) and to coagulate the precipitate of iron, aluminum, calcium or magnesium phosphates, which will form if these impurities be present. In case this solution is higher than 1.30–1.36 specific gravity at 85° C., wash water or mother liquor should be added to reduce the specific gravity to that mentioned. From the mixing tank 2 the di-sodium phosphate solution passes through a filter of any standard type to remove the precipitate from the solution. The clear solution of di-sodium phosphate is then mixed with a caustic soda solution to form tri-sodium phosphate. This reaction is represented by the following equation:

$$Na_2HPO_4 \cdot 12H_2O + NaOH = Na_3PO_4 \cdot 12H_2O + H_2O$$

Caustic soda solution may be prepared by dissolving solid caustic, or commercial caustic solution may be used. The strength of the solution may be varied, but if made from solid caustic a solution containing approximately 70–72% NaOH is preferred. Since commercial caustic soda solution contains only approximately 50% NaOH, this may not be used exclusively; however, a mixture of solid caustic dissolved in the commercial solution may be satisfactorily used. The tri-sodium phosphate solution is then filtered in any standard filter to remove solid matter introduced by the caustic, as well as any precipitate which may result from the addition of caustic soda to the di-sodium phosphate solution. In the addition of caustic soda, sufficient is added until titration with half normal acid of a sample of the solution being "causticized," shows a relation of the end point of phenolphthalein and the end points of phenolphthalein and methyl orange varying between 0.53 and 0.56, arrived at by dividing the reading from the phenolphthalein end point, by the sum of the phenolphthalein and methyl orange end points. This relation of titrations is a simple and quick means of controlling the addition of caustic. After "causticizing," the solution should have a specific gravity from 1.36 to 1.40 at 85° C. for best operation. After filtration, the solution is run into any suitable crystallizing equipment. The use of a continuous crystallizer is preferred, as thereby a continuous feed and discharge is obtained. It is desirable to add a certain percentage of mother liquor, from previous crystallizations, to aid in suspending the crystals and to facilitate handling. The quantity of mother liquor added will vary depending on operating conditions at the time, and the only means of judging is the fact that crystals produced are of the size desired, and handle readily in the crystallizer. From the crystallizer, the crystals pass into a centrifuge where they are de-watered before passing to the dryer.

Since the melting point of tri-sodium phosphate is very low, it is necessary to avoid overheating and either melting or partly de-hydrating the crystals. In order that the dried crystals may be in the best physical condition, it is preferable that they be passed through a cooler after the dryer, that they may be at atmospheric temperature when stored or packed.

The solution, eliminated from the crystals in the centrifuge, flows to a sump tank from where it may be returned by pump 11, to mixing tank 2 or 4 as conditions of operation require.

By the use of strong phosphoric acid and the apparatus as described, I am enabled to produce tri-sodium phosphate more efficiently and less expensively than otherwise, since the expensive evaporation step employed in common practice is eliminated.

Having thus described my invention, what I claim as new and desire to secure by Letters Patent, is:—

1. The hereindescribed process for the production of tri-sodium phosphate, which consists in subjecting sodium carbonate to the action of phosphoric acid having more than 50% $H_3PO_4$ to form di-sodium phosphate, then adding sufficient caustic soda to convert said di-sodium phosphate into tri-sodium phosphate, substantially as described.

2. The hereindescribed process for the production of tri-sodium phosphate, which consists in subjecting sodium carbonate to the action of strong phosphoric acid having more than 50% $H_3PO_4$ to form di-sodium phosphate, then removing all solid matter, then adding caustic soda to convert said di-sodium phosphate to tri-sodium phosphate, substantially as described.

3. The hereindescribed process for the production of tri-sodium phosphate, which consists in subjecting sodium carbonate in solution to the action of strong phosphoric acid having more than 50% $H_3PO_4$ to form di-sodium phosphate, then removing all solid matter, then adding caustic soda solution to convert said di-sodium phosphate into tri-sodium phosphate, then cooling said tri-sodium phosphate solution until crystals of tri-sodium phosphate form, substantially as described.

4. The hereindescribed process for the production of tri-sodium phosphate, which consists in subjecting a sodium carbonate solution to the action of strong phosphoric acid to form a di-sodium phosphate solution of approximately 1.33 specific gravity at 85° C., then removing all solid matter, then adding caustic soda solution to convert said di-sodium phosphate into tri-sodium phosphate, then cooling said tri-sodium phosphate solution until crystals of tri-sodium phosphate form, then separating said crystals from the accompanying solution, substantially as described.

5. The hereindescribed process for the production of tri-sodium phosphate, which consists in subjecting sodium carbonate to the action of strong phosphoric acid to form a di-sodium phosphate solution of approximately 1.33 specific gravity at 85° C., then removing all solid matter therefrom, then adding caustic soda solution to convert said di-sodium phosphate into tri-sodium phosphate in a solution of approximately 1.38 specific gravity at 85° C., then cooling said tri-sodium phosphate solution until crystals of tri-sodium phosphate are formed, then separating said crystals from the accompanying solution, then drying said crystals, substantially as described.

6. The hereindescribed continuous process of producing tri-sodium phosphate crystals, which consists in producing a trisodium phosphate solution from strong acid, continuously feeding such tri-sodium phosphate solution having an approximate specific gravity of 1.36 to 1.40 at 85° C. to a crystallizer, and continuously withdrawing crystals of tri-sodium phosphate therefrom, and returning the mother liquor to the tri-sodium phosphate solution, substantially as described.

In testimony whereof I affix my signature.

JOHN N. CAROTHERS.